United States Patent
Wu et al.

(10) Patent No.: US 12,538,374 B2
(45) Date of Patent: Jan. 27, 2026

(54) METHOD AND APPARATUS FOR SIDELINK COMMUNICATION DURING FAST MCG LINK RECOVERY PROCEDURE

(71) Applicant: Lenovo (Beijing) Ltd., Beijing (CN)

(72) Inventors: Lianhai Wu, Chaoyang (CN); Jing Han, Chaoyang District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 471 days.

(21) Appl. No.: 17/923,727

(22) PCT Filed: May 7, 2020

(86) PCT No.: PCT/CN2020/088993
§ 371 (c)(1),
(2) Date: Nov. 7, 2022

(87) PCT Pub. No.: WO2021/223159
PCT Pub. Date: Nov. 11, 2021

(65) Prior Publication Data
US 2023/0180329 A1   Jun. 8, 2023

(51) Int. Cl.
*H04W 76/19* (2018.01)
(52) U.S. Cl.
CPC .................. *H04W 76/19* (2018.02)
(58) Field of Classification Search
CPC .. H04L 41/0654; H04W 76/14; H04W 76/15; H04W 76/19; H04W 88/04; H04W 24/08;
(Continued)

(56) References Cited

U.S. PATENT DOCUMENTS

2018/0020387 A1\* 1/2018 Van Der Velde ... H04W 36/305
2020/0059395 A1   2/2020 Chen
(Continued)

FOREIGN PATENT DOCUMENTS

CN   110536445 A   12/2019
CN   110798867 A   2/2020
(Continued)

OTHER PUBLICATIONS 1 202080100559.5 , "Foreign Office Action", CN Application No. 202080100559, Mar. 18, 2024, 19 pages.
(Continued)

*Primary Examiner* — Zhensheng Zhang
(74) *Attorney, Agent, or Firm* — FIG. 1 Patents

(57) ABSTRACT

The present application relates to a method and an apparatus for sidelink communication during a fast master cell group (MCG) link recovery procedure. One embodiment of the subject application provides a method performed by a user equipment (UE), comprising: determining a radio link failure (RLF) of Master Cell Group (MCG) if one of the following conditions is met: a timer associated with physical layer problem for PCell expires; a random access problem for MCG; and a maximum number of retransmissions has been reached in MCG Radio Link Control (RLC); and initiating a fast MCG link recovery procedure and starting a timer associated with the fast MCG link recovery procedure, wherein the UE is configured with the timer associated with the fast MCG link recovery procedure and configured to transmit sidelink communication.

19 Claims, 9 Drawing Sheets

(58) Field of Classification Search
CPC ....... H04W 24/10; H04W 4/40; H04W 72/25; H04W 92/18
See application file for complete search history.

(56) References Cited

U.S. PATENT DOCUMENTS

| | | | |
|---|---|---|---|
| 2020/0314803 A1* | 10/2020 | Zhang | H04W 74/006 |
| 2020/0344771 A1* | 10/2020 | Kang | H04W 76/14 |
| 2021/0194404 A1 | 6/2021 | Itou et al. | |
| 2021/0289507 A1* | 9/2021 | Wang | H04W 72/02 |
| 2023/0262540 A1* | 8/2023 | Kim | H04W 36/362 370/216 |

FOREIGN PATENT DOCUMENTS

| | | |
|---|---|---|
| EP | 4055886 A1 | 9/2022 |
| JP | 2019531006 A | 10/2019 |
| WO | 2019246382 A1 | 12/2019 |
| WO | 2020057760 A1 | 3/2020 |

OTHER PUBLICATIONS 20934826.7, "Extended European Search Report", EP Application No. 20934826.7, Dec. 21, 2023, 11 pages.

Ericsson, "Running CR for 36.331 for CA&DC enh", 3GPP TSG-RAN WG2 Meeting #109-e, R2-2002287, Reno, USA [retrieved Nov. 2, 2022]. Retrieved from the Internet <https://www.3gpp.org/ftp/tsg_ran/WG2_RL2/TSGR2_109_e/Docs?sortby=namerev>., Nov. 2019, 138 Pages.

CATT, "Considerations on Mobility Enhancements", 3GPP TSG RAN WG2 Meeting #93, R2-161187, St. Julian's, Malta [retrieved Dec. 15, 2022]. Retrieved from the Internet <https://www.3gpp.org/ftp/tsg_ran/WG2_RL2/TSGR2_93/Docs/>., Feb. 2016, 2 Pages.

CATT, "Type 1 Sidelink Configured Grant Validity Time", 3GPP TSG-RAN WG2 Meeting #108, R2-1914454, Reno, JSA [retrieved Dec. 15, 2022]. Retrieved from the Internet <https://www.3gpp.org/ftp/TSG_RAN/WG2_RL2/TSGR2_108/Docs/>., Nov. 2019, 3 Pages.

Ericsson, "Correction of conditional handover including RIL E901", 3GPP TSG-RAN WG2 Meeting #109bis-e, R2-2003040, Electronic meeting [retrieved Dec. 15, 2022]. Retrieved from the Internet <https://www.3gpp.org/ftp/TSG_RAN/WG2_RL2/TSGR2_109bis-e/Docs/?sortby=sizerev>., Apr. 2020, 1047 Pages.

PCT/CN2020/088993, "International Preliminary Report on Patentability", PCT Application No. PCT/CN2020/088993, Nov. 17, 2022, 6 pages.

PCT/CN2020/088993, "International Search Report and Written Opinion", PCT Application No. PCT/CN2020/088993, Jan. 27, 2021, 7 pages.

"Foreign Office Action", CN Application No. 202080100559.5, Dec. 30, 2024, 17 pages.

202080100559.5, "Foreign Office Action", CN Application No. 202080100559.5, Aug. 2, 2024, 13 pages.

2022-567818, "Foreign Notice of Acceptance", JP Application No., Sep. 6, 2024, 5 pages.

Ericsson, "Fast MCG recovery via SCells of MCG", 3GPP TSG-RAN WG2 #107, Tdoc R2-1910273, Prague, Czech Republic, Aug. 2019, 8 pages.

Huawei, "Considerations on RLM for NR V2X unicast", 3GPP TSG-RAN WG2 Meeting#106, R2-1907419, Reno, USA (revision of R2-1904876), May 2019, 4 pages.

* cited by examiner

METHOD AND APPARATUS FOR SIDELINK COMMUNICATION DURING FAST MCG LINK RECOVERY PROCEDURE

TECHNICAL FIELD

The subject application relates to wireless communication technology, especially to a method and an apparatus for sidelink communication during a fast master cell group (MCG) link recovery procedure.

BACKGROUND OF THE INVENTION

When a radio link failure (RLF) occurs for a UE, the UE may initiate a fast MCG link recovery procedure. Currently, it is not determined how to deal with the sidelink communication during the fast MCG link recovery procedure, it is also not determined how to use the configured grant type 1, or how to handle the channel busy ratio (CBR) measurement and report during the fast MCG link recovery procedure.

Therefore, it is desirable to solve the above undetermined issues during the fast MCG link recovery procedure.

SUMMARY

One embodiment of the subject application provides a method performed by a user equipment (UE), comprising: determining a radio link failure (RLF) of Master Cell Group (MCG) if one of the following conditions is met: a timer associated with physical layer problem for PCell expires; a random access problem for MCG; and a maximum number of retransmissions has been reached in MCG Radio Link Control (RLC); and initiating a fast MCG link recovery procedure and starting a timer associated with the fast MCG link recovery procedure, wherein the UE is configured with the timer associated with the fast MCG link recovery procedure and configured to transmit sidelink communication.

Another embodiment of the subject application provides a method performed by a master node, comprising: configuring a timer associated with a fast Master Cell Group (MCG) link recovery procedure to a user equipment (UE); and configuring parameters for sidelink communication to the UE.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a user equipment (UE), comprising: determining a radio link failure (RLF) of Master Cell Group (MCG) if one of the following conditions is met: a timer associated with physical layer problem for PCell expires; a random access problem for MCG; and a maximum number of retransmissions has been reached in MCG Radio Link Control (RLC); and initiating a fast MCG link recovery procedure and starting a timer associated with the fast MCG link recovery procedure, wherein the UE is configured with the timer associated with the fast MCG link recovery procedure and configured to transmit sidelink communication.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a master node, comprising: configuring a timer associated with a fast Master Cell Group (MCG) link recovery procedure to a user equipment (UE); and configuring parameters for sidelink communication to the UE.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Next generation radio access network (NG-RAN) supports multi-radio dual connectivity (MR-DC) operation. In the MR-DC operation, a UE with multiple transceivers may be configured to utilize resources provided by two different nodes connected via non-ideal backhauls. One node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

Figure 1:
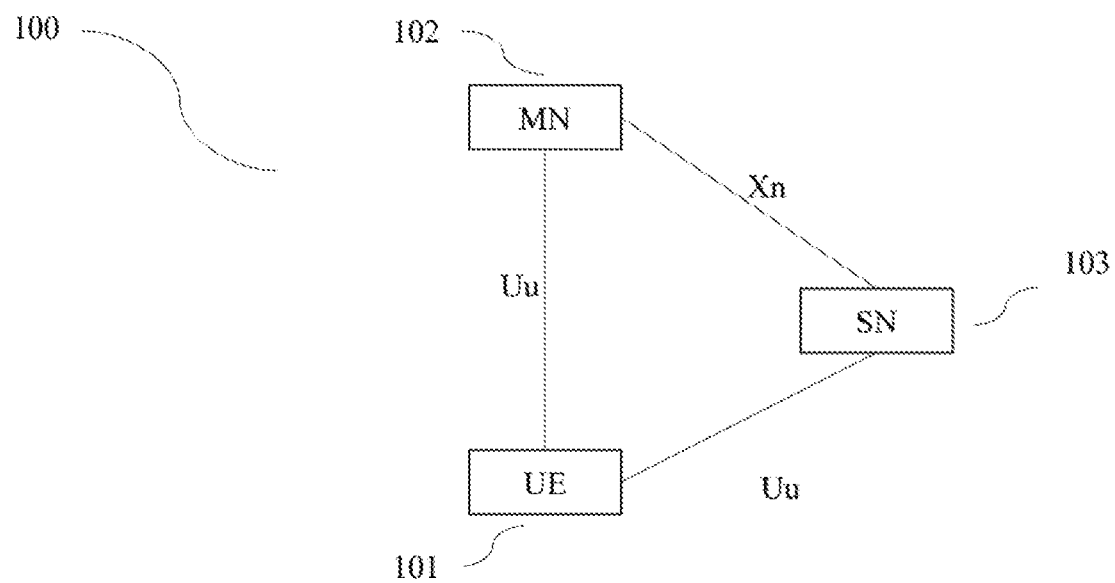
FIG. 1 illustrates a schematic diagram of a wireless communication system 100 in accordance with some embodiments of the subject disclosure.

For example, FIG. 1 illustrates a schematic diagram of a wireless communication system 100 in accordance with some embodiments of the present application.

As shown in FIG. 1, the wireless communication system 100 may be a dual connectivity system includes at least one UE 101, at least one MN 102, and at least one SN 103. In particular, the dual connectivity system 100 in FIG. 1 includes UE 101, MN 102, and SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may connect to the MN 102 and the SN 103 via a network interface, for example, Uu interface as specified in 3GPP standard documents. The MN 102 and the SN 103 may be connected with each other via a network interface, for example, Xn interface as specified in 3GPP standard documents. The MN 102 may be connected to the core network via a network interface (not shown in FIG. 1). The UE 102 may be configured to utilize resources provided by the MN 102 and the SN 103 to perform data transmission.

The MN 102 may refer to a radio access node that provides a control plane connection to the core network. In an embodiment of the present application, in the E-UTRA-NR DC (EN-DC) scenario, the MN may be an eNB. In another embodiment of the present application, in the next generation E-UTRA-NR DC (NGEN-DC) scenario, the MN may be an ng-eNB. In yet another embodiment of the present application, in the NR-DC scenario or the NR-E-UTRA DC (NE-DC) scenario, the MN may be a gNB.

The MN may be associated with a MCG. The MCG may refer to a group of serving cells associated with the MN, and may include a primary cell (PCell) and optionally one or more secondary cells (SCells). The PCell may provide a control plane connection to UE 101.

The SN 103 may refer to a radio access node without control plane connection to the core network but providing additional resources to the UE. In an embodiment of the present application, in the EN-DC scenario, the SN may be an en-gNB. In another embodiment of the present application, in the NE-DC scenario, the SN may be a ng-eNB. In yet another embodiment of the present application, in the NR-DC scenario or the NGEN-DC scenario, the SN may be a gNB.

The SN may be associated with a secondary cell group (SCG). The SCG may refer to a group of serving cells associated with the SN, and may include a primary secondary cell (PSCell) and optionally one or more secondary cells (SCells). The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In 3GPP Release 16, a fast MCG link recovery procedure is introduced for MR-DC. The purpose of this procedure is to inform an RLF in an MCG to the MN via a SN connected to the UE, such that the UE in RRC_CONNECTED state may initiate the fast MCG link recovery procedure to quickly recover the RRC connection without performing a re-establishment procedure.

Figure 2A:
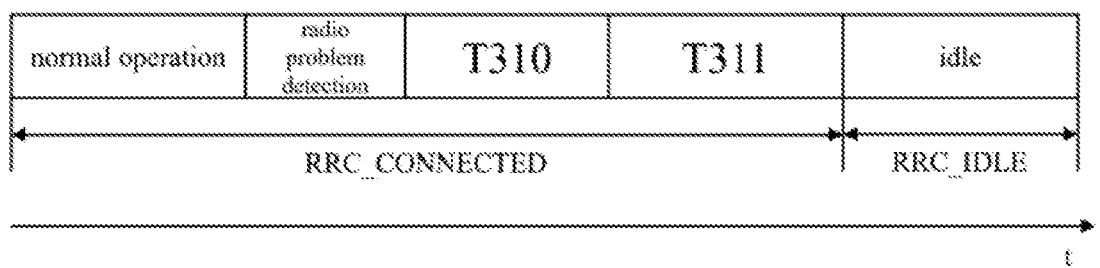
FIG. 2(a) illustrates an exemplary timeline of an RLF without a fast MCG link recovery procedure in accordance with some embodiments of the present application.

FIG. 2(a) illustrates an exemplary timeline of an RLF without a fast MCG link recovery procedure in accordance with some embodiments of the present application.

The UE first performs data transmission at the stage of normal operation, if the UE detects a radio problem, for example, the MAC layer of the UE receives the consecutive N310 out-of-sync indication from physical layer, which means a radio link problem occurs. The UE then starts a timer, e.g. timer T310. During the period of timer T310, if the MAC layer of the UE receives the consecutive N311 in-sync indication from physical layer, which means the UE is successfully connected to the network, then the UE stops timer T310. When timer T310 expires, the UE performs a re-establishment procedure and starts timer T311 for cell selection. During the period of timer T311, if the UE re-establishes the connection with the network, the UE stops timer T311. If timer T311 expires, the UE enters into an idle state, e.g. RRC_IDLE. Before timer T311 expires, the UE is in RRC_CONNECTED state. When timer T311 expires, the UE enters into RRC_IDLE state.

For the subject disclosure, which involves dual connectivity, the UE determines RLF when one of the following conditions is met: i) a timer associated with physical layer problem for PCell expires; ii) a random access problem for MCG; and iii) a maximum number of retransmissions has been reached in MCG Radio Link Control (RLC).

Figure 2B:
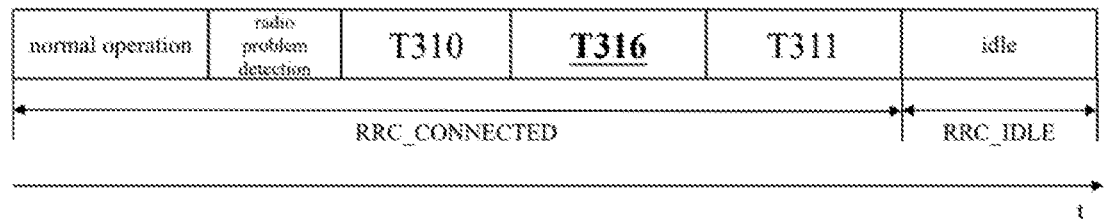
FIG. 2(b) illustrates an exemplary timeline of an RLF with a fast MCG link recovery procedure in accordance with some embodiments of the present application.

FIG. 2(b) illustrates an exemplary timeline of an RLF with a fast MCG link recovery procedure in accordance with some embodiments of the present application.

FIG. 2(b) differs from FIG. 2(a) in the period of timer T316, which is located between the period of timer T310 and the period of timer T311. That is, when timer T310 expires, the UE initiates a fast MCG link recovery procedure. Specifically, the UE transmits the MCG failure information to MN 102 via SN 103 and starts timer T316. If the UE receives the RRC reconfiguration from MN via SN, then UE stops timer T316, which means that the fast MCG link recovery procedure is terminated. In the case that the UE receives the RRC reconfiguration message only including sidelink configuration, the UE does not stop the timer T316. In the case that the UE receives the RRC reconfiguration message including sidelink configuration and an indication of resume T316, the UE does not stop the timer T316. In the case that the UE receives the RRC reconfiguration message including handover command for a cell, the UE may perform handover for the UE to the cell. In the case that the UE receives the RRC release message, then the UE shall enter into an RRC_IDLE state.

If the UE does not receive the RRC reconfiguration, when timer T316 expires, the UE performs a re-establishment procedure and starts timer T311 for cell selection. If T311 expires, the UE enters into an idle state, e.g. RRC_IDLE. Before timer T311 expires, the UE is in RRC_CONNECTED state, after timer T311 expires, the UE is in RRC_IDLE state.

Figure 3:
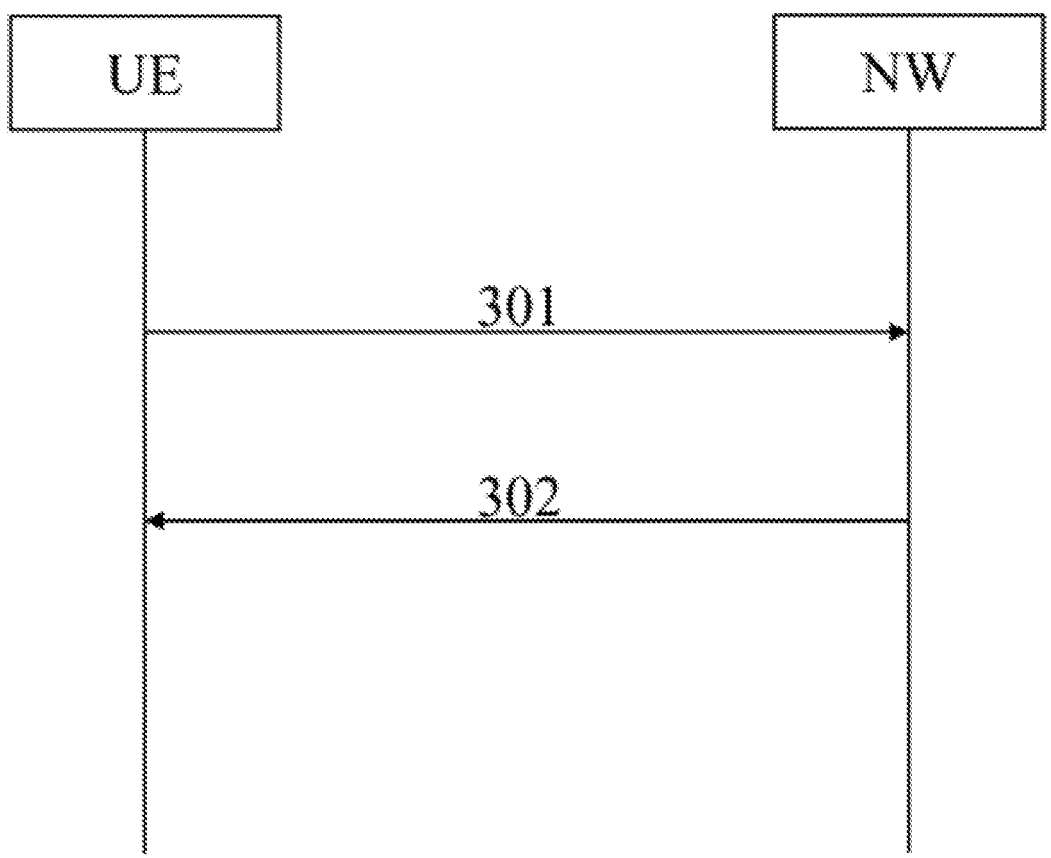
FIG. 3 illustrates an exemplary flowchart of a fast MCG link recovery procedure in accordance with some embodiments of the present application.

FIG. 3 illustrates an exemplary flowchart of a fast MCG link recovery procedure in accordance with some embodiments of the present application. As shown in FIG. 3, in the case that an RLF in an MCG for the UE happens, the UE may initiate (or, trigger) a fast MCG link recovery procedure. For example, in step 301, the UE may transmit a failure information message associated with the RLF to network, for example, to the MN via the SN. In an embodiment of the present application, the RLF in the MCG may refer to the RLF happening in the PCell of the MCG. In an embodiment of the present application, the message associated with the RLF in step 301 may be a MCGFailureInformation message as specified in 3GPP standard documents. The UE may not directly transmit the message associated with the RLF to the MN. Instead, the UE may transmit the message associated with the RLF to the SN, and then the SN may transfer the message received from the UE to the MN.

For example, the UE may be configured with a split signaling radio bearer (SRB) 1 or SRB3 to report the MCG failure information when an RLF in the MCG happens. In the case that split SRB1 is configured, the UE may submit the MCGFailureInformation message to low layers, e.g., for transmission via SRB1. In the case that SRB3 is configured, the UE may submit the MCGFailureInformation message to low layers for transmission via SRB3. For example, the MCGFailureInformation message may be embedded in NR RRC message ULInformationTransferMRDC as specified in 3GPP standard documents for transmission via SRB3.

MCG receives the MCG failure indication, one of the reconfigurations of sync and release message will be transmitted to UE.

After MCG receives the MCG failure information message, in step 302, the MN may transmit a response message to the UE. The response message in step 302 may be an RRC reconfiguration message including a handover command for a cell or an RRC release message. A new RRC message, i.e., DLInformationTransferMRDC, is introduced in order to allow the SN to encapsulate (for SRB3) the MN response (i.e., RRCReconfiguration or RRCRelease message) to be send to the UE. The MN may not directly transmit the response message to the UE. Instead, the MN may transmit the response message to the SN, and then the SN may transfer the response message to the UE.

There are several MCG failure types, i) if the UE initiates transmission of the MCGFailureInformation message due to T310 expiry, UE sets the failureType as t310-Expiry; ii) if the UE initiates transmission of the MCGFailureInformation message to provide random access problem indication from MCG MAC, UE sets the failureType as randomAccessProblem; and iii) if the UE initiates transmission of the MCGFailureInformation message to provide indication from MCG RLC that the maximum number of retransmissions has been reached, UE sets the failureType as rlc-MaxNumRetx.

Figure 4:
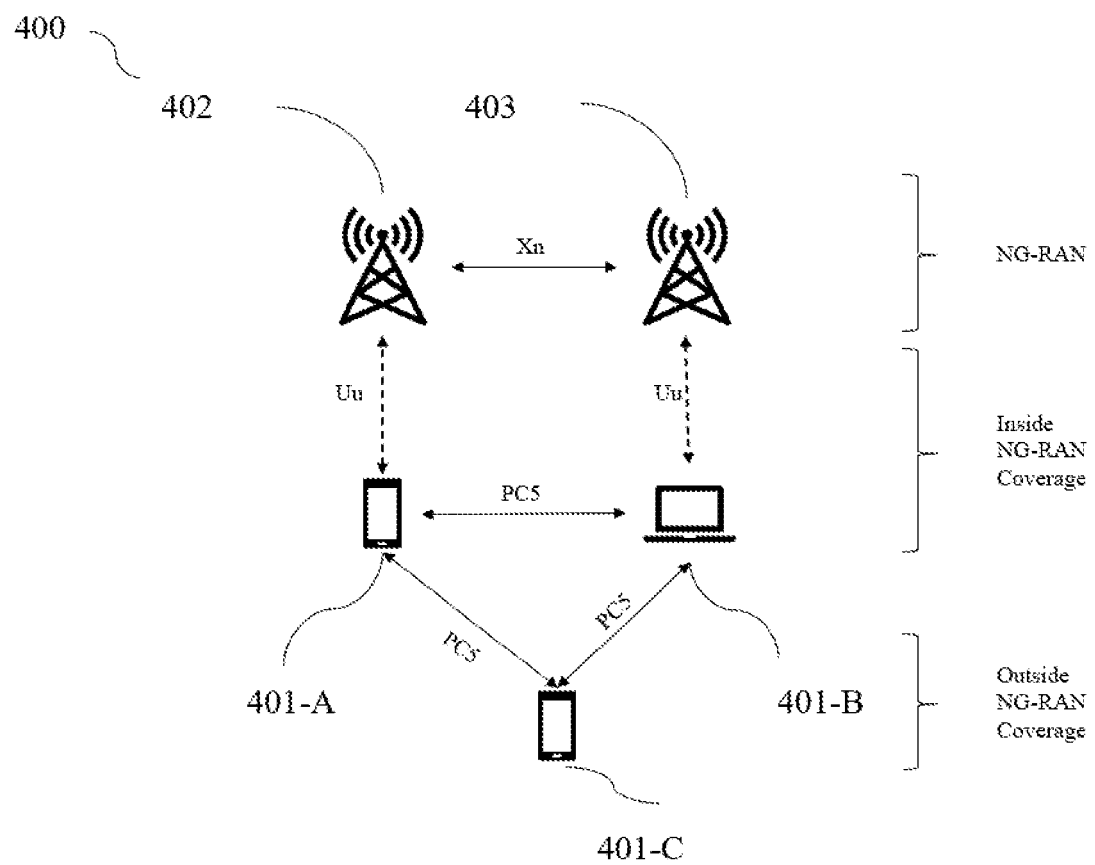
FIG. 4 illustrates an exemplary V2X communication system 400 in accordance with some embodiments of the present application.

FIG. 4 illustrates an exemplary V2X communication system 400 in accordance with some embodiments of the present application.

As shown in FIG. 4, the V2X communication system includes one gNB 402, one ng-eNB 403, and some V2X UEs, i.e., UE 401-A, UE 401-B, and UE 401-C. UE 401-A is within the coverage of gNB 402, UE 401-B is within the coverage of ng-eNB 403, and UE 401-C is out of coverage of gNB 402 and ng-eNB 403. Support of V2X services via the PC5 interface can be provided by NR sidelink communication and/or V2X sidelink communication. NR sidelink communication can support one of three types of transmission modes for a pair of a Source Layer-2 ID and a Destination Layer-2 ID: unicast transmission; groupcast transmission; and broadcast transmission. Sidelink transmission and reception over the PC5 interface are supported when the UE is either inside of the NG-RAN coverage or outside of the NG-RAN coverage.

UE 401-A, which is in the coverage of within the coverage of gNB 402, may perform sidelink unicast transmission, sidelink groupcast transmission, or sidelink broadcast transmission over the PC5 interface. UE 401-C, which is out of coverage, can also perform sidelink transmission and reception over the PC5 interface. It is contemplated that, in accordance with some other embodiments of the present application, a V2X communication system may include more or fewer BSs, and more or fewer V2X UEs. Moreover, it is contemplated that names of V2X UEs (which represent a Tx UE, a Rx UE, and etc.) as illustrated and shown in FIG. 4 may be different, e.g., UE 401c, UE 404f, and UE 408g or the like.

In addition, although each V2X UE as shown in FIG. 4 is illustrated in the shape of a cell phone, it is contemplated that a V2X communication system may include any type of UE (e.g., a roadmap device, a cell phone, a computer, a laptop, IoT (internet of things) device or other type of device) in accordance with some other embodiments of the present application.

According to some embodiments of FIG. 4, UE 401-A functions as a Tx UE, and UE 401-B and UE 401-C function as a Rx UE. UE 401-A may exchange V2X messages with UE 401-B, or UE 401-C through a sidelink, for example, PC5 interface as defined in 3GPP TS 23.303. UE 401-A may transmit information or data to other UE(s) within the Vehicle-to-Everything (V2X) communication system, through sidelink unicast, sidelink groupcast, or sidelink broadcast. The sidelink communication includes NR sidelink communication, and V2X sidelink communication. For instance, UE 401-A may transmit data to UE 401-C in a NR sidelink unicast session, and UE 401-B may transmit data to UE 401-C in a V2X sidelink unicast session. UE 401-A may transmit data to UE 401-B and UE 401-C in a groupcast group by a sidelink groupcast transmission session.

Sidelink communication includes NR Sidelink communication and V2X Sidelink communication. FIG. 4 demonstrates the NR Sidelink communication specified in TS 38.311. V2X sidelink communication is specified in TS 36.311.

The V2X UEs may operate in different modes. At least two sidelink resource allocation modes are defined for sidelink communication, which are: mode 1: base station schedules sidelink resource(s) to be used by UE for sidelink transmission(s); and mode 2: UE determines sidelink transmission resource(s) within sidelink resources configured by base station or network, or pre-configured sidelink resources, in mode 2, the base station does not dynamically schedules the sidelink resources for the UE, and the UE decides the sidelink transmission resources and timing in the resource pool based on the measurement result and sensing result. In FIG. 4, UE 101-A and UE 101-B are in mode 1, and UE 101-C is in mode 2, and in this disclosure, we use UE 101-A representing a transmitting UE in mode 1, and UE 101-C representing another transmitting UE in mode 2.

In mode 1, the UE needs to be in RRC_CONNECTED state in order to transmit data. Base station can dynamically schedule resources to the UE via physical downlink control channel (PDCCH) for NR sidelink Communication. In addition, Base station can allocate sidelink resources to UE with two types of configured sidelink grants:

Type 1: RRC directly provides the configured sidelink grant only for NR sidelink communication; and Type 2, RRC defines the periodicity of the configured sidelink grant while PDCCH can either signal and activate the configured sidelink grant, or deactivate it.

For the UE performing NR sidelink communication, there can be more than one configured sidelink grant activated at a time on the carrier configured for sidelink transmission.

When beam failure or a physical layer problem occurs on NR Uu, the UE can continue using the configured sidelink grant type 1. During handover, the UE can be provided with configured sidelink grants via handover command. If provided, the UE activates the configured sidelink grant type 1 upon reception of the handover command.

When a UE is in mode 2, the UE can transmit data either inside or outside of the coverage of a BS, i.e. either inside NG-RAN coverage or outside NG-RAN coverage. The UE autonomously selects sidelink grant from a pool of resources provided by system information or dedicated signalling while inside a BS's coverage or by pre-configuration while outside of a BS's coverage.

For NR sidelink communication, the resource pool can be provided for a given validity area where the UE does not need to acquire a new pool of resources while moving within the validity area, at least when this pool is provided by SIB, e.g. reuse valid area of NR SIB. The UE is allowed to temporarily use UE autonomous resource selection with random selection for sidelink transmission based on configuration of the exceptional transmission resource pool as specified in TS 38.331.

Figure 5A:
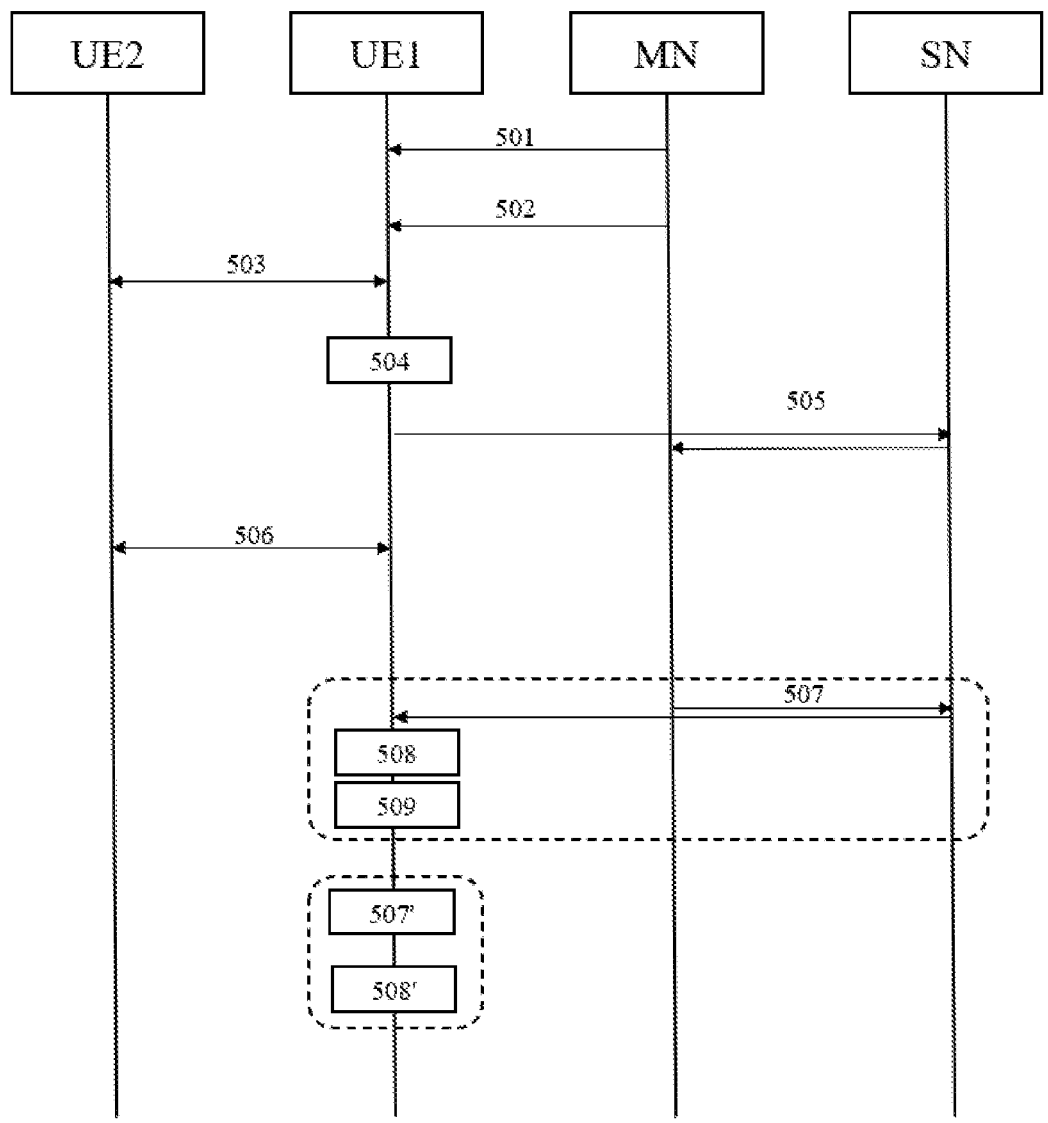
FIG. 5(a) illustrates a flowchart of performing sidelink communication during a fast MCG link recovery procedure according to some embodiments of the subject application.
Figure 5B:
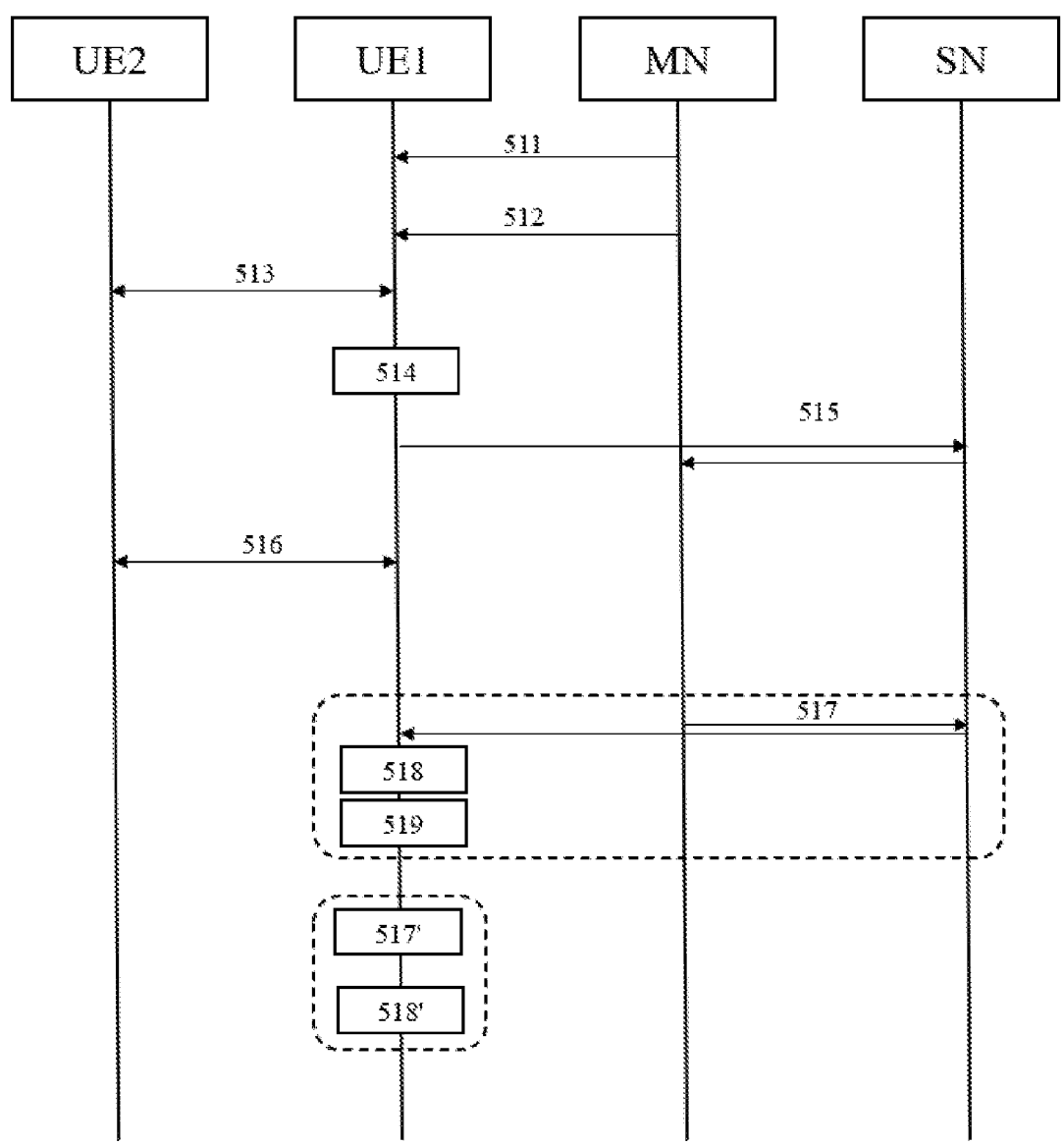
FIG. 5(b) illustrates another flowchart of performing sidelink communication during a fast MCG link recovery procedure according to some embodiments of the subject application.

FIG. 5(*a*) illustrates a flowchart of performing sidelink communication during a fast MCG link recovery procedure according to some embodiments of the subject application.

In step 501, UE1 accesses the base station, which is the master node, and receives the system information about sidelink communication. In step 502, the connected UE1 receives the reconfiguration message, which may include one or more of the following parameters: the period value of the timer, T316; the exceptional pool for the sidelink communication; and the configured grant type 1. Furthermore, the UE may be configured to add a SN as DC, and the UE may be configured with scheduled resource allocation (sl-ScheduledConfig).

In step 503, UE1 performs sidelink communication with UE2, in particular, UE1 may transmit data to UE2, or receive data from UE2 using sidelink via mode 1 resource, e.g. the configured grant type 1.

In step 504, RLF happens in UE1's MCG link. For example, timer T310 expires. Then in step 505, UE1 initiates fast MCG link recovery and starts a timer, e.g. timer T316, and transmits a message reporting the MCG failure including failure type, e.g. MCGfailureinformation message, to MN via SN.

In step 506, UE1 performs sidelink communication with UE2 using the resource randomly selected from the exceptional pool, which is included in the system information. In particular, UE1 shall configure lower layers, e.g. physical layer, to transmit the sidelink control information and the corresponding data based on random selection using the exceptional pool of resources. Step 506 may be implemented by any one of two options. In option 1, if exceptional pool is configured by dedicated signalling or broadcasting signalling to UE1, UE1 shall configure lower layers, e.g. physical layer, to transmit the sidelink control information and the corresponding data based on random selection using the exceptional pool of resources when timer T316 is running. In option 2, if exceptional pool is configured by dedicated signalling or broadcasting signalling and configured grant type1 is not configured, UE1 shall configure lower layers, e.g. physical layer, to transmit the sidelink control information and the corresponding data based on random selection using the exceptional pool of resources when timer T316 is running. That is, the configured grant type1 has priority over the exceptional pool to be used by UE1.

In step 507, within the period of timer T316, the base station, e.g. the MN transmits the reconfiguration message to UE via SN. In step 508, UE1 receives the reconfiguration message from network, then UE1 stops timer T316. Handover command may be included in the reconfiguration message. If the UE receives the RRC reconfiguration message including handover command for a cell, UE1 may perform handover to the configured cell. In step 509, UE1 performs handover and starts timer T304. UE1 may perform the sidelink communication by configuring lower layers, e.g. physical layer, to transmit the sidelink control information and the corresponding data based on random selection using the exceptional pool of resources.

Steps 507' and 508' are an alternative condition of steps 507-509. In step 507', UE1 does not receive the reconfiguration message from network within the period of timer T316, UE1 performs a re-establishment procedure and starts timer T311. In step 508', UE1 may configure lower layers, e.g. physical layer, to transmit the sidelink control information and the corresponding data based on random selection using the exceptional pool of resources.

FIG. 5(*b*) illustrates another flowchart of performing sidelink communication during a fast MCG link recovery procedure according to some embodiments of the subject application. Specifically, FIG. 5(*b*) focuses on the configured grant type 1 during the fast MCG link recovery procedure.

Steps 511-515 and steps 517-519, and steps 517' and 518' are similar to Steps 501-505 and steps 507-509, and steps 507' and 508' in FIG. 5(*a*), and the details are omitted here.

In step 516, UE1 may transmit the sidelink control information and the corresponding data based on configured grant type 1. Step 516 may be implemented by any one of three options. In option 1, UE1 transmits the sidelink control information and the corresponding data associated with logical channel based on configured grant type 1 configured for this logical channel when timer T316 is running. Alternatively, in option 2, UE1 cannot use the configured SL grant type 1 while timer T316 is running. In other words, configured SL grant type 1 cannot be used after timer T316 starts. In option 3, UE1 transmits the sidelink control information and the corresponding data based on configured grant type 1 when timer T316 is running and exceptional pool is not configured. That is, the exceptional pool has priority over the configured grant type1 to be used by UE1.

Figure 5C:
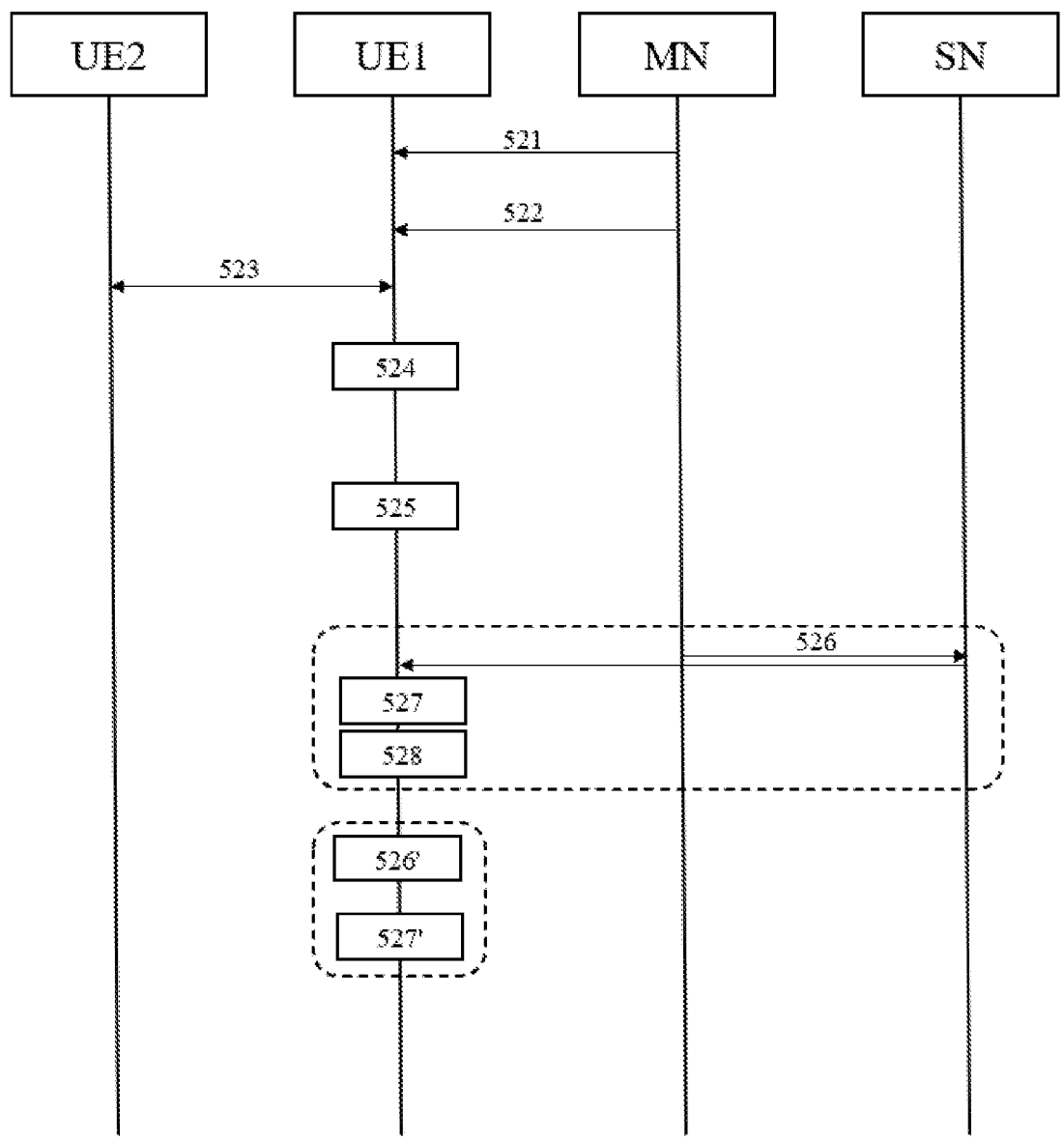
FIG. 5(c) illustrates a flowchart of performing CBR measurements in sidelink during a fast MCG link recovery procedure according to some embodiments of the subject application.

FIG. 5(c) illustrates a flowchart of performing CBR measurements in sidelink during a fast MCG link recovery procedure according to some embodiments of the subject application.

The network may configure the UE to perform CBR measurements in sidelink. The measurement configuration includes the following parameters: measurement object, reporting configuration, and measurement identities.

For CBR measurement of NR sidelink communication, a measurement object is a set of transmission resource pools on a single carrier frequency for NR sidelink communication. For CBR measurement of V2X sidelink communication, a measurement object is a set of transmission resource pools on a carrier frequency for V2X sidelink communication.

One or more reporting configurations will be configured to be associated with one measurement object. A list of reporting configurations may be configured. Reporting configuration at least includes reporting criterion. The criterion that triggers the UE to send a measurement report. This can either be periodical or a single event description.

One measurement identity links one measurement object with one reporting configuration. A list of measurement identities may be configured to UE. In general, when UE receives the configuration of CBR measurement, UE will perform measurement. Once the event condition is met, UE will report the CBR measurement result to gNB.

In step 521, UE1 accesses the base station, which is the master node, and receives the system information about sidelink communication. The system information may include mode 2 resource, e.g. sl-TxPoolSelectedNormal, or may include the exceptional pool, e.g. sl-TxPoolExceptiona for the concerned frequency.

In step 522, the connected UE1 receives the reconfiguration message, which may include one or more of the following parameters: the period value of the timer, T316, mode 2 resource, e.g. sl-TxPoolSelectedNormal, mode 1 resource, e.g. sl-TxPoolScheduling, and the exceptional pool for the sidelink communication. Furthermore, the UE may be configured to add a SN as DC.

In step 523, UE1 performs sidelink communication with UE2, in particular, UE1 transmits data to UE2, or receives data from UE2 using sidelink via model resource, e.g. the configured grant type 1, or via mode 2 resource. The mode used by UE1 depends on the configuration from MN, and UE1 perform CBR measurement on mode 1 resource, mode 2 resource or resource from the exceptional pool.

In step 524, RLF happens in UE1's MCG link. For example, timer T310 expires. Then in step 525, UE1 then start a timer, e.g. timer T316, and transmits a message reporting the MCG failure including failure type and CBR measurement result, e.g. MCGfailureinformation message, to MN via SN.

Step 525 may be implemented by two options. In option 1, UE1 continues CBR measurement after fast MCG link recovery procedure is triggered. Then, UE reports the CBR measurement result to MN via SN when T316 is running. According to current measurement configuration, the UE includes the CBR measurement results in the MCG Failure Information message, e.g. MCGfailureinformation message. Once the fast MCG link recovery procedure is triggered, the UE maintains the CBR measurement configurations, and continues CBR measurements based on configuration.

In option 2, UE1 continues CBR measurement after fast MCG link recovery procedure is triggered. However, UE1 does not report CBR measurement result to network when the T316 is running, even if the condition for measurement report is met. Alternatively, UE1 may not perform CBR measurement after the fast MCG link recovery procedure is triggered. That is, step 525 is omitted.

Steps 526-528 are similar to steps 507-509 in FIG. 5(a), Steps 526' and 527' are similar to steps 527' and 528' in FIG. 5(a), and the details are omitted here.

After MN receives CBR measurement result via SN from UE, MN may reconfigure the resource pool for sidelink communication. That is, the UE would receive RRC reconfiguration only including sidelink configuration, and UE1 does not stop timer T316 when receiving RRC reconfiguration only including sidelink configuration.

Figure 6:
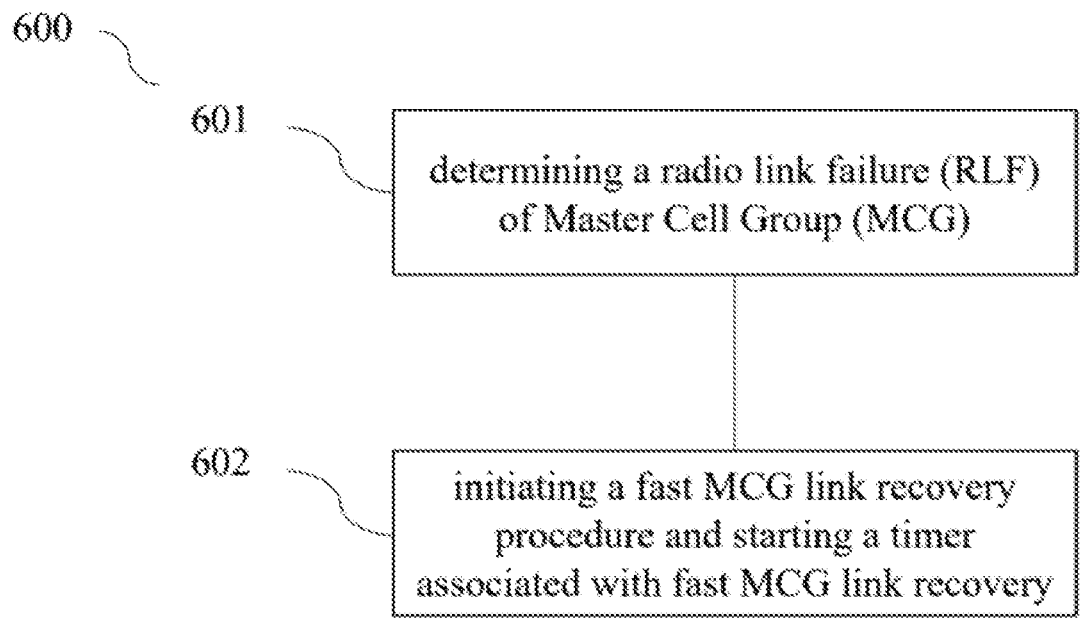
FIG. 6 illustrates a method performed by a user equipment (UE) according to a preferred embodiment of the subject disclosure.

FIG. 6 illustrates a method 600 performed by a UE according to a preferred embodiment of the subject disclosure.

In step 601, the UE determines a RLF of Master Cell Group (MCG) if one of the following conditions is met: i) a timer associated with physical layer problem for PCell expires; for example, timer T310 expires, ii) a random access problem for MCG; and iii) a maximum number of retransmissions has been reached in MCG RLC. In step 602, the UE initiates a fast MCG link recovery procedure and starting a timer associated with the fast MCG link recovery procedure, e.g. timer T316. The UE is configured with the timer T316 and also configured to transmit sidelink communication. The sidelink communication in the subject disclosure includes NR sidelink communication using NR technology, and V2X sidelink communication using E-UTRA technology.

An exceptional pool of resources for sidelink communication is indicated by an RRC reconfiguration message or a SIB signalling. If timer T316 is running, the UE may transmit data based on random selection using the exceptional pool of resources, that is, the UE performs the sidelink communication with resources randomly selected from the exceptional pool. Alternatively, if timer T316 is running and sidelink configured grant type 1 for the sidelink logical channel is not configured, the UE may transmit data associated with a sidelink logical channel based on random selection using the exceptional pool of resources. In this embodiment, the UE is in an RRC_CONNECTED state, and the UE is configured with network scheduling for NR sidelink transmission.

In another embodiment, the UE may configure mode 1 resources, e.g. sidelink configured grant type 1, for a sidelink logical channel. The UE may transmit data associated with the sidelink logical channel using sidelink configured grant type 1 if the timer T316 is running. Alternatively, the UE may transmit data associated with the sidelink logical channel using sidelink configured grant type 1 if the timer T316 is running and an exceptional pool of resources is not configured. Or, the UE may transmit data associated with the sidelink logical channel using sidelink configured grant type 1 if the timer T316 is running and an exceptional pool of resources is configured. That is, the UE transmit data associated with the sidelink logical channel using sidelink configured grant type 1 if the timer T316 is running, no matter the exceptional pool of resources is configured or not.

The UE may include a result of the CBR measurement in an MCG Failure Information message, e.g. the MCGFailureInformation message, and then transmit the result to a MN via a SN. In one embodiment, the CBR measurement configurations is maintained after the fast MCG link recovery procedure is triggered. The UE may perform a CBR measurement on the transmission resources after the fast MCG link recovery procedure is triggered. If the report is triggered and timer T316 is running, the UE reports the result of the CBR measurement to network.

In another embodiment, the UE stops the CBR measurement after the fast MCG link recovery procedure is triggered. Alternatively, the UE does not report the result of CBR measurement to network if the report is triggered and timer T316 is running. That is, the UE may still perform the CBR measurement, but does not report the result, or the UE does not perform the CBR measurement and does not report the result.

In yet another embodiment, the UE does not stop timer T316 if it is running when the UE receives RRC reconfiguration message only including sidelink configuration.

Figure 7:
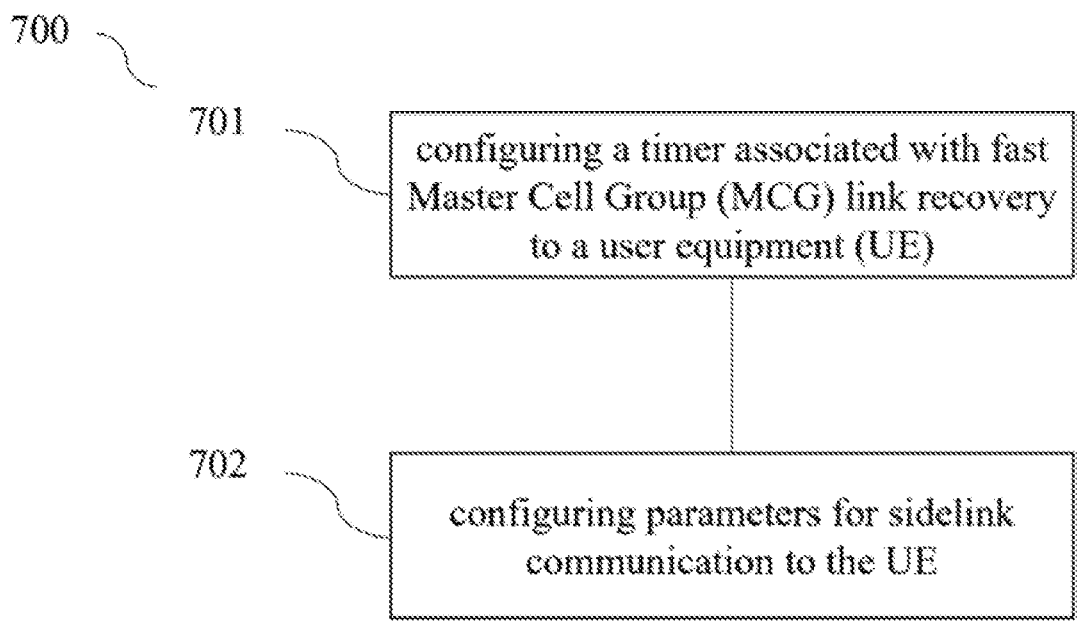
FIG. 7 illustrates a method performed by a Master Node (MN) according to a preferred embodiment of the subject disclosure.

FIG. 7 illustrates a method 700 performed by a BS according to a preferred embodiment of the subject disclosure.

In step 701, the MN configures timer T316 to a UE, and in step 702, the MN further configures parameters for sidelink communication to the UE.

The MN may receive an MCG Failure Information message including a result of the CBR measurement from the UE. The MN then reconfigures the parameters for sidelink communication to the UE when timer T316 is running.

Figure 8:
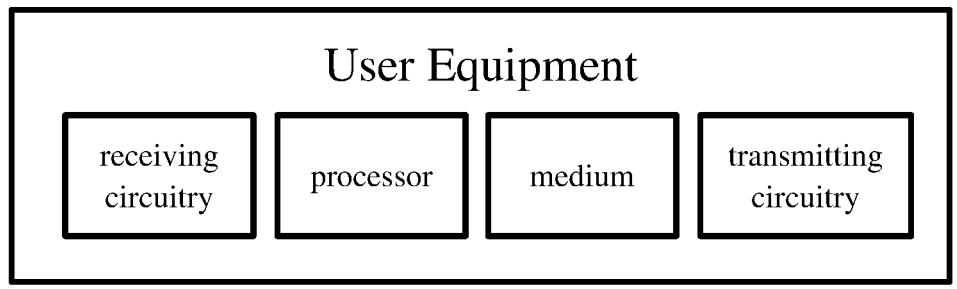
FIG. 8 illustrates a block diagram of a UE according to the embodiments of the subject disclosure.

FIG. 8 illustrates a block diagram of a UE according to the embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 6) with the receiving circuitry, the transmitting circuitry and the processor. That is, upon performing the computer executable instructions, the processor may determine a RLF of Master Cell Group (MCG) if one of the following conditions is met: i) a timer associated with physical layer problem for PCell expires; for example, timer T310 expires, ii) a random access problem for MCG; and iii) a maximum number of retransmissions has been reached in MCG RLC. The processor then initiates a fast MCG link recovery procedure and starting a timer associated with the fast MCG link recovery procedure, e.g. timer T316.

Figure 9:
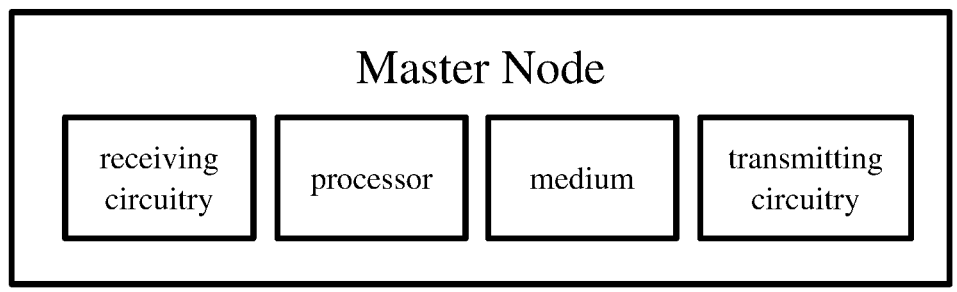
FIG. 9 illustrates a block diagram of a MN according to the embodiments of the subject disclosure.

FIG. 9 illustrates a block diagram of a MN according to the embodiments of the present disclosure. The MN 102 may include a receiving circuitry, a processor, and a transmitting circuitry. In one embodiment, the MN may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 7) with the receiving circuitry, the transmitting circuitry and the processor. That is, upon performing the computer executable instructions, the processor may configure timer T316 to a UE, and further configures parameters for sidelink communication to the UE.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a first user equipment (UE), the method comprising:
receiving, from a network equipment (NE), first signaling configuring an exceptional pool of resources corresponding to a sidelink communication between the first UE and a second UE, wherein the first signaling comprises at least one of radio resource control (RRC) reconfiguration signaling or system information block SIB) signaling;
receiving, from the NE, second signaling configuring a timer associated with a fast master cell group (MCG) link recovery procedure;
determining a radio link failure (RLF) of a master cell group (MCG) based at least in part on one or more conditions, wherein the one or more conditions comprise:
an additional timer associated with a physical layer problem for primary cell expires;
a random access problem for the MCG; or
a maximum number of retransmissions being satisfied in an MCG radio link control (RLC);
initiating, based at least in part on determining the RLF of the MCG, a fast MCG link recovery procedure to indicate the RLF of the MCG;
starting the timer associated with the fast MCG link recovery procedure; and transmitting, to the second UE and based at least in part on the timer associated with the fast MCG link recovery procedure running, data using a randomly selected resource from the exceptional pool of resources.

2. The method of claim 1, further comprising:
receiving, prior to expiry of the timer associated with the fast MCG link recovery procedure, additional RRC reconfiguration signaling comprising a handover command; and
stopping the timer associated with the fast MCG link recovery procedure in response to reception of the handover command.

3. The method of claim 1, wherein the data is associated with a sidelink logical channel, and wherein the data is transmitted based at least in part on a sidelink configured grant type 1 for the sidelink logical channel failing to be configured.

4. The method of claim 1, wherein the UE is in an RRC connected state, and wherein the first UE is configured with network scheduling for a new radio (NR) sidelink transmission.

5. The method of claim 1, wherein sidelink configured grant type 1 for a sidelink logical channel is configured, and wherein the method further comprises at least one of:
transmitting additional data associated with the sidelink logical channel using the sidelink configured grant type 1 if the timer associated with the fast MCG link recovery procedure is running;
transmitting the additional data associated with the sidelink logical channel using the sidelink configured grant type 1 if the timer associated with the fast MCG link recovery procedure is running and an additional exceptional pool of resources is not configured; or
transmitting the additional data based on random selection using the additional exceptional pool of resources if the timer associated with the fast MCG link recovery procedure is running and the additional exceptional pool is configured.

6. The method of claim 1, further comprising:
transmitting, to a master node (MN) via a secondary node (SN), an MCG failure information message comprising a result of a channel busy ratio (CBR) measurement;
maintaining one or more CBR measurement configurations after the fast MCG link recovery procedure is initiated;
performing the CBR measurement on transmission resources after the fast MCG link recovery procedure is initiated; and
transmitting the result of the CBR measurement to a network device based at least in part on a report comprising the result of the CBR measurement being triggered and the timer associated with the fast MCG link recovery procedure running.

7. The method of claim 1, further comprising:
stopping a channel busy ratio (CBR) measurement after the fast MCG link recovery procedure is initiated.

8. A first user equipment (UE) for wireless communication, comprising:
at least one memory; and
at least one processor coupled with the at least one memory and operable to cause the first UE to:
receive, from a network equipment (NE), first signaling configuring an exceptional pool of resources corresponding to a sidelink communication between the first UE and a second UE, wherein the first signaling comprises at least one of radio resource control (RRC) reconfiguration signaling or system information block (SIB) signaling;
receive, from the NE, second signaling configuring a timer associated with a fast master cell group (MCG) link recovery procedure;
determine a radio link failure (RLF) of a master cell group (MCG) based at least in part on one or more conditions, wherein the one or more conditions comprise:
an additional timer associated with a physical layer problem for primary cell expires;
a random access problem for the MCG; or
a maximum number of retransmissions being satisfied in an MCG radio link control (RLC);
initiate, based at least in part on determining the RLF of the MCG, a fast MCG link recovery procedure to indicate the RLF of the MCG;
start the timer associated with the fast MCG link recovery procedure; and
transmit, to the second UE and based at least in part on the timer associated with the fast MCG link recovery procedure running, data using a randomly selected resource from the exceptional pool of resources.

9. The first UE of claim 8, wherein the sidelink communication is one of new radio (NR) sidelink communication using NR technology or vehicle to everything (V2X) sidelink communication using evolved universal terrestrial radio access (E-UTRA) technology.

10. The first UE of claim 8, wherein the at least one processor is further operable to cause the first UE to:
receive, prior to expiry of the timer associated with the fast MCG link recovery procedure, additional RRC reconfiguration signaling comprising a handover command; and
stop the timer associated with the fast MCG link recovery procedure in response to reception of the handover command.

11. The first UE of claim 8, wherein the data is associated with a sidelink logical channel, and wherein the data is transmitted based at least in part on a sidelink configured grant type 1 for the sidelink logical channel failing to be configured.

12. The first UE of claim 8, wherein the first UE is in RRC connected state, and wherein the first UE is configured with network scheduling for new radio (NR) sidelink transmission.

13. The first UE of claim 8, wherein sidelink configured grant type 1 for a sidelink logical channel is configured, and wherein the at least one processor is further operable to cause the first UE to at least one of:
transmit additional data associated with the sidelink logical channel using the sidelink configured grant type 1 if the timer associated with the fast MCG link recovery procedure is running;
transmit the additional data associated with the sidelink logical channel using the sidelink configured grant type 1 if the timer associated with the fast MCG link recovery procedure is running and an additional exceptional pool of resources is not configured; or
transmit the additional data based on random selection using the additional exceptional pool of resources if the timer associated with the fast MCG link recovery procedure is running and the additional exceptional pool is configured.

14. The first UE of claim 8, wherein the at least one processor is further operable to cause the first UE to:

transmit, to a master node (MN) via a secondary node (SN), an MCG failure information message comprising a result of a channel busy ratio (CBR) measurement;
maintain one or more CBR measurement configurations after the fast MCG link recovery procedure is initiated;
perform the CBR measurement on transmission resources after the fast MCG link recovery procedure is initiated; and
transmit the result of the CBR measurement to a network device based at least in part on a report comprising the result of the CBR measurement being triggered and the timer associated with the fast MCG link recovery procedure running.

15. The first UE of claim 8, wherein the at least one processor is further operable to cause the first UE to stop a channel busy ratio (CBR) measurement after the fast MCG link recovery procedure is initiated.

16. A network equipment (NE) for wireless communication, comprising:
at least one memory; and
at least one processor coupled with the at least one memory and operable to cause the NE to:
    transmit, to a first user equipment (UE), first signaling configuring an exceptional pool of resources corresponding to a sidelink communication between the first UE and a second UE, wherein the first signaling comprises at least one of radio resource control (RRC) reconfiguration signaling or system information block (SIB) signaling; and
    transmit, to the first UE, second signaling configuring a timer associated with a fast master cell group (MCG) link recovery procedure), wherein the timer is initiated based at least in part on a radio link failure (RLF) of an MCG, and wherein the sidelink communication is performed using a randomly selected resource from the exceptional pool of resources based at least in part on the timer associated with the fast MCG link recovery procedure running.

17. The NE of claim 16, wherein the at least one processor is further operable to cause the NE to receive an MCG failure information message including a result of a channel busy ratio (CBR) measurement from the first UE.

18. The NE of claim 16, wherein the at least one processor is further operable to cause the apparatus to reconfigure the NE to transmit third signaling configuring one or more parameters for the sidelink communication based at least in part on the timer associated with the fast MCG link recovery procedure running.

19. A method performed by a network equipment (NE), the method comprising:
transmitting, to a first user equipment (UE), first signaling configuring an exceptional pool of resources corresponding to a sidelink communication between the first UE and a second UE, wherein the first signaling comprises at least one of radio resource control (RRC) reconfiguration signaling or system information block (SIB) signaling; and
transmitting, to the first UE, second signaling configuring a timer associated with a fast master cell group (MCG) link recovery procedure, wherein the timer is initiated based at least in part on a radio link failure (RLF) of an MCG, and wherein the sidelink communication is performed using a randomly selected resource from the exceptional pool of resources based at least in part on the timer associated with the fast MCG link recovery procedure running.

* * * * *